(12) United States Patent  
Nishikawa et al.

(10) Patent No.: US 8,141,961 B2  
(45) Date of Patent: Mar. 27, 2012

(54) VEHICLE-USE BRAKE DEVICE

(75) Inventors: Yutaka Nishikawa, Saitama (JP); Kazuya Takenouchi, Saitama (JP); Masaie Kato, Saitama (JP); Shinji Takayanagi, Saitama (JP); Yoko Uno, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 600 days.

(21) Appl. No.: 12/361,727

(22) Filed: Jan. 29, 2009

(65) Prior Publication Data

US 2009/0195060 A1 Aug. 6, 2009

(30) Foreign Application Priority Data

Jan. 31, 2008 (JP) ................................ 2008-022049

(51) Int. Cl.  
*B60T 8/34* (2006.01)

(52) U.S. Cl. ..................................................... 303/119.3

(58) Field of Classification Search ............... 303/115.1, 303/115.2, 119.2, 119.3, DIG. 10; 137/884  
See application file for complete search history.

(56) References Cited

U.S. PATENT DOCUMENTS

| | | | | |
|---|---|---|---|---|
| 6,616,248 | B2 * | 9/2003 | Obuse et al. | 303/119.3 |
| 7,578,564 | B2 * | 8/2009 | Sakai | 303/119.3 |
| 2007/0228818 | A1 * | 10/2007 | Tsuchida et al. | 303/115.1 |
| 2009/0096283 | A1 * | 4/2009 | Nishikawa et al. | 303/122.05 |

FOREIGN PATENT DOCUMENTS

| | | |
|---|---|---|
| EP | 1 847 430 A1 | 10/2007 |
| EP | 1 873 029 A1 | 1/2008 |
| JP | 2006-117075 A | 5/2006 |
| JP | 2006-117076 A | 5/2006 |

* cited by examiner

*Primary Examiner* — Christopher Schwartz  
(74) *Attorney, Agent, or Firm* — Birch, Stewart, Kolasch & Birch, LLP

(57) ABSTRACT

A vehicle-use brake device for miniaturization of a base body and the simplification of brake liquid pressure passages formed in the base body. First electromagnetic open/close valves changing over communication/interruption between master cylinders which output liquid pressures due to the operation of brake operators and wheel brakes, and second electromagnetic open/close valves changing over communication/interruption between a liquid-pressure generation member which are configured to generate liquid pressures due to operations of electrically-operated actuators and the wheel brakes are arranged in the base body. An output port which is connected to a wheel brake is formed in one flat side surface of a base body, first and second electromagnetic open/close valves which arrange operational axes thereof on a first plane orthogonal to one side surface are mounted on one surface of the base body which orthogonally intersects with one side surface from the same direction.

19 Claims, 10 Drawing Sheets

VEHICLE-USE BRAKE DEVICE

CROSS-REFERENCE TO RELATED APPLICATIONS

The present application claims priority under 35 USC 119 to Japanese Patent Application No. 2008-022049 filed on Jan. 31, 2008 the entire contents of which are hereby incorporated by reference.

BACKGROUND OF THE INVENTION

1. Field of the Invention

The present invention relates to a vehicle-use brake device in which first electromagnetic open/close valves changing over communication/interruption between master cylinders which output liquid pressures due to operations of brake operators and wheel brakes and second electromagnetic open/close valves changing over communication/interruption between liquid-pressure generating means which are configured to generate liquid pressures due to operations of electrically-operated actuators and the wheel brakes are arranged in a base body.

2. Description of Background Art

In JP-A-2006-117076 or the like, there has been known a so-called by-wire-type vehicle-use brake device which applies a liquid pressure to a wheel brake by controlling the liquid pressure from a liquid-pressure generating means which is configured to generate the liquid pressure due to an operation of an electrically-operated actuator corresponding to a brake operation quantity in a state that the connection between a master cylinder and a wheel brake is interrupted. In such a vehicle-use brake device, a plurality of electromagnetic open/close valves are provided for opening or closing brake liquid-pressure passages, a plurality of pressure sensors are provided for detecting pressures in the brake liquid-pressure passages and the like are arranged in a base body to form a unit which is referred to as a hydraulic control unit. In the vehicle-use brake device disclosed in JP-A-2006-117076, in mounting the vehicle-use brake device on a motorcycle, a three-wheeled vehicle or the like, the arrangement of the respective electromagnetic open/close valves and the respective pressure sensors is designed so as to miniaturize the base body, that is, the hydraulic control unit.

To take the application of the vehicle-use brake device to the motorcycle into consideration, there has been a demand for the further miniaturization of the base body, that is, the hydraulic control unit. Further, with respect to the vehicle-use brake device disclosed in the above-mentioned JP-A-2006-117076, first and second electromagnetic open/close valves which are connected to output ports formed on one side surface of the base body are arranged on the base body in a state that the operational axes of the first and second electromagnetic open/close valves are arranged on a plane parallel to the above-mentioned one side surface. Thus, liquid pressure passages which connect the first and second electromagnetic open/close valves and the output ports become complicated thus increasing the working man-hours. Accordingly, simplification of the liquid pressure passages formed in the base body has been also requested.

SUMMARY AND OBJECTS OF THE INVENTION

The present invention has been made under such circumstances, and it is an object of an embodiment of the present invention to provide a vehicle-use brake device which can realize the simplification of brake liquid pressure passages formed in a base body along with the miniaturization of the base body.

To achieve the above-mentioned object according to an embodiment of the present invention, a vehicle-use brake device is provided in which first electromagnetic open/close valves changing over communication/interruption between master cylinders which output liquid pressures corresponding to operations of brake operators and wheel brakes occurs, and second electromagnetic open/close valves changing over communication/interruption between liquid-pressure generation means which are configured to generate liquid pressures corresponding to operations of electrically-operated actuators and the wheel brakes are arranged in a base body. Output ports which are connected to the wheel brakes are formed in one flat side surface of the base body, and the first and second electromagnetic open/close valves which have operational axes thereof arranged on a first plane orthogonal to said one side surface are mounted on one surface of the base body orthogonal to said one side surface from the same direction.

According to an embodiment of the present invention, stroke simulators apply pseudo reactional forces corresponding to operation quantities of the brake operators to the master cylinders at the time of closing the first electromagnetic open/close valves are arranged in the base body with stroke directions thereof set parallel to the first plane.

According to an embodiment of the present invention, input ports are connected to the master cylinders with brake liquid pressure passages each of which has both ends thereof communicably connected to the input port and the output port and interposes the first electromagnetic open/close valve therein. Branch passages are provided each of which is branched from the brake liquid pressure passage between the first electromagnetic open/close valve and the input port and is connected to the stroke simulator are arranged in the base body. Third electromagnetic open/close valves are provided each of which is interposed in the branch passage so as to change over communication/interruption between the master cylinder and the stroke simulator and first pressure sensors each of which is connected to the branch passage between the third electromagnetic open/close valve and the stroke simulator so as to detect a pressure on the stroke simulator side are, in a state that an operation axis of the third electromagnetic open/close valves and the first pressure sensors are arranged on a second plane parallel to the first plane and the stroke direction of the stroke simulators, mounted on the base body from the same direction as the mounting direction of the first and second electromagnetic open/close valves.

According to an embodiment of the present invention, second pressure sensors, each of which is connected to the brake liquid pressure passage between the input port and the first electromagnetic open/close valve so as to detect a liquid pressure on the master cylinder side, are arranged in the base body between the first and second planes.

A brake lever 15 and a brake pedal 16 of an embodiment correspond to the brake operators of the present invention, a mounting surface 37a of the embodiment corresponds to said one surface of the base body of the present invention, a first side surface 37b of the embodiment corresponds to said one side surface of the base body of the present invention, a first input port 58 of the embodiment corresponds to the input port of the present invention, and a first brake liquid-pressure passage 77 of the embodiment corresponds to the brake liquid-pressure passage of the present invention.

According to an embodiment of the present invention, the first and second electromagnetic open/close valves are mounted on said one surface of the base body orthogonal to said one side surface of the base body from the same direction in a state wherein the operational axes of the first and second electromagnetic open/close valves are arranged on the same first plane orthogonal to said one side surface of the base body. Thus, it is possible to set a width necessary for the arrangement of the first and second electromagnetic open/close valves in the direction orthogonal to the first plane small thus contributing to the miniaturization of the base body. Further, the first plane orthogonally intersects with said one side surface of the base body in which the output ports connected to the wheel brakes are formed and the first and second electromagnetic open/close valves are respectively connected to the output ports. Thus, the liquid-pressure passages which respectively connect the first and second electromagnetic open/close valves and the output ports are formed into a simple shape which extends linearly parallel to the first plane thus reducing working man-hours in forming the holes in the base body.

Further, according to an embodiment of the present invention, the stroke simulator is arranged in the base body with stroke directions thereof set parallel to the first plane. Thus, it is possible to set a width of the base body in the direction orthogonal to the first plane small thus contributing to the miniaturization of the base body.

According to an embodiment of the present invention, in the branch passage which is branched from the brake liquid pressure passage having both ends thereof communicably connected to the input port and the output port which are connected to the master cylinder and interposing the first electromagnetic open/close valve therein and is connected to the stroke simulator, the third electromagnetic open/close valve changing over communication/interruption between the master cylinder and the stroke simulator is interposed, the first pressure sensor which detects the pressure on a side of the stroke simulator is connected to the branch passage, and the operation axis of the third electromagnetic open/close valve and the first pressure sensor are arranged on the second plane arranged parallel to the first plane and the stroke direction of the stroke simulator. Accordingly, it is possible to decrease the width necessary for the arrangement of the first electromagnetic open/close valve, the second electromagnetic open/close valve, the third electromagnetic open-close valve and the first pressure sensor in the direction orthogonal to the first plane and the second plane thus contributing to the miniaturization of the base body. Further, out of the branch passage, portions which are connected to the third electromagnetic open/close valve and the first pressure sensor are formed into a simple linear shape parallel to the second plane thus reducing the working man-hours in forming the branch passage in the base body. The third electromagnetic open/close valve and the first pressure sensor are mounted on the base body in the same direction as the first and second electromagnetic open/close valves. Thus, it is possible to efficiently assemble the first electromagnetic open/close valve, the second electromagnetic open/close valve, the third electromagnetic open/close valve and the first pressure sensor to the base body.

According to an embodiment of the present invention, the second pressure sensor which is connected to the brake liquid pressure passage between the input port and the first electromagnetic open/close valve is arranged in the base body between the first and second planes. Thus, the first electromagnetic open/close valve, the second electromagnetic open/close valve, the third electromagnetic open/close valve, the first pressure sensor and the second pressure sensor can be arranged in the base body in a compact manner thus realizing the further miniaturization of the base body.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, a mode for carrying out the present invention is explained in conjunction with one embodiment of the present invention shown in the attached drawings.

FIG. 1 to FIG. 10 are views showing one embodiment of the present invention.

Figure 1:
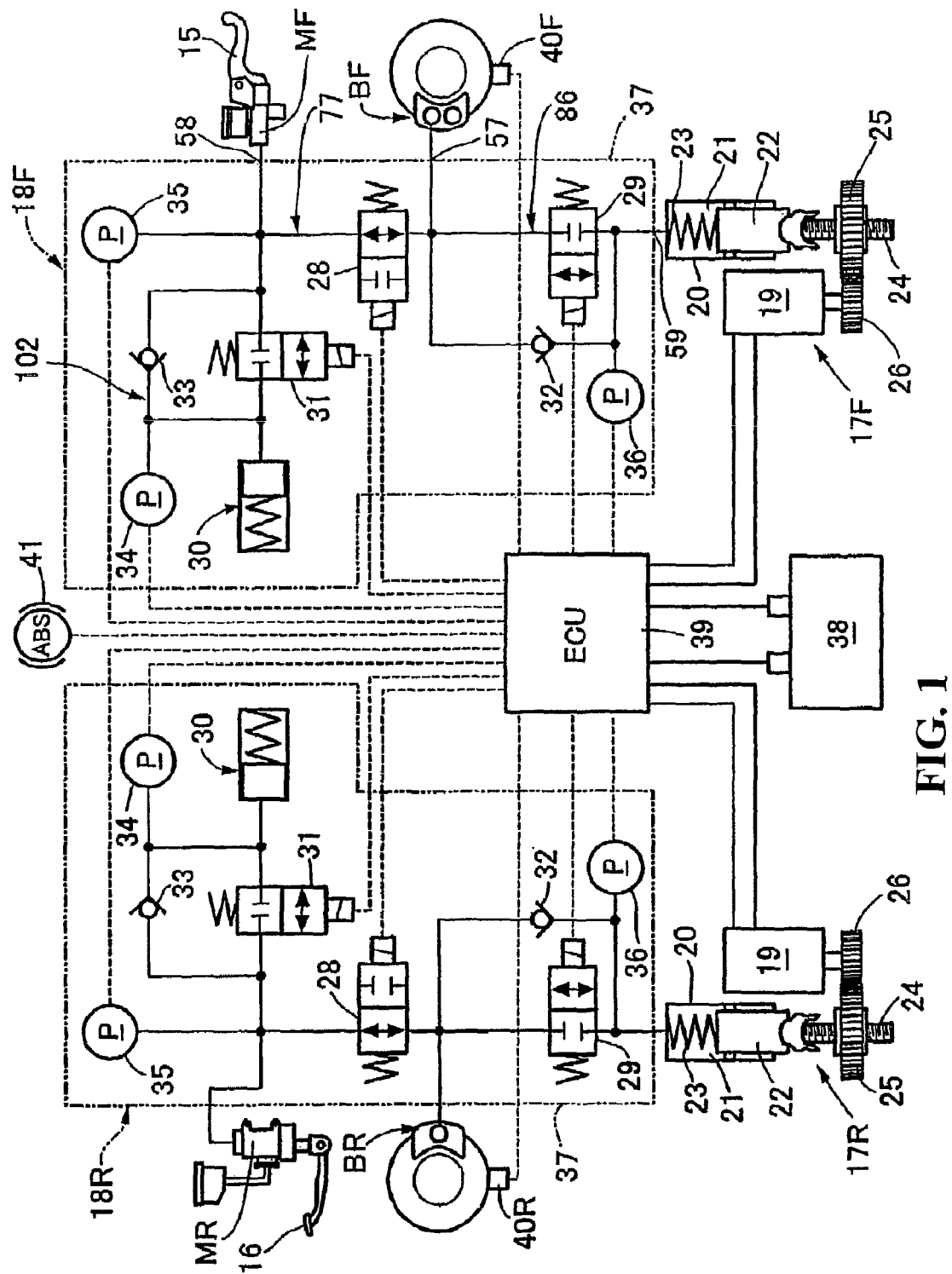
FIG. 1 is a view showing the constitution of a motorcycle-use brake device.

As illustrated in FIG. 1, for example, to a front-wheel-use wheel brake BF which the motorcycle includes, it is possible to apply a liquid pressure outputted from a front-wheel-use master cylinder MF corresponding to a operation of a brake lever 15 constituting a brake operation element and, at the same time, it is also possible to apply a liquid pressure outputted from a front-wheel-use liquid-pressure generation means 17F. A front-wheel-use hydraulic control unit 18F is interposed between the front-wheel-use master cylinder MF and the front-wheel-use liquid-pressure generation means 17F and the front-wheel-use wheel brake BF. Further, to a rear-wheel-use wheel brake BR, it is possible to apply a liquid pressure outputted from a rear-wheel-use master cylinder MR in response to an operation of a brake pedal 16 constituting a brake operation element and, at the same time, it is also possible to apply a liquid pressure outputted from a rear-wheel-use liquid-pressure generation means 17R. A rear-wheel-use hydraulic control unit 18R is interposed between the rear-wheel-use master cylinder MR and the rear-wheel-use liquid-pressure generation means 17R and the rear-wheel-use wheel brake BR.

The front-wheel-use liquid-pressure generation means 17F generates the liquid pressure with an operation of an electrically-operated motor 19 which constitutes an electrically-operated actuator. The front-wheel-use liquid-pressure generation means 17F includes the electrically-operated motor 19, a piston 22 which defines a hydraulic chamber 21 between a cylinder body 20 and the piston 22 and is slidably fitted in the cylinder body 20, a return spring 23 which is arranged between the cylinder body 20 and the piston 22 in a shrinkable manner so as to bias the piston 22 in the direction that a volume of the hydraulic chamber 21 is increased, a pushing shaft 24 which is coaxially and contiguously connected to the piston 22 from a side opposite to the hydraulic chamber 21, and a gear mechanism 26 which is connected to an output shaft of the electrically-operated motor 19 while including a gear 25 which is coaxially and threadedly engaged with the pushing shaft 24 by way of a ball screw (not shown in the drawing). The front-wheel-use liquid-pressure generation means 17F can output a liquid pressure which is changed corresponding to an operation of the electrically-operated motor 19 from the hydraulic chamber 21.

The rear-wheel-use liquid-pressure generation means 17R is constituted in the substantially same manner as the front-wheel-use liquid-pressure generation means 17F. Thus, the detailed explanation of the rear-wheel-use liquid-pressure generation means 17R is omitted by illustrating the means 17R in the drawing and giving the same numerals to portions of the means 17R corresponding to portions of the front-wheel-use liquid-pressure generation means 17F.

The front-wheel-use hydraulic control unit 18F is configured such that a first electromagnetic open-close valve 28 changing over communication/interruption between the front-wheel-use master cylinder MF and the front-wheel-use wheel brake BF, a second electromagnetic open-close valve 29 changing over communication/interruption between the front-wheel-use liquid-pressure generation means 17F and the front-wheel-use wheel brake BF, a stroke simulator 30 which applies a pseudo reactional force corresponding to an operational quantity of the brake lever 15 to the front-wheel-use master cylinder MF at the time of closing the first electromagnetic open-close valve 28, a third electromagnetic open-close valve 31 changing over communication/interruption between the stroke simulator 30 and the front-wheel-use master cylinder MF, a first one-way valve 32 which is connected to the second electromagnetic open-close valve 29 in a juxtaposed manner so as to allow the flow of a brake liquid from the front-wheel-use liquid-pressure generation means 17F toward the front-wheel-use wheel brake BF side, a second one-way valve 33 which is connected to the third electromagnetic open-close valve 31 in a juxtaposed manner so as to allow the flow of a brake liquid from the stroke simulator 30 toward the front-wheel-use wheel brake BF side, a first pressure sensor 34 which detects a pressure applied to the stroke simulator 30, a second pressure sensor 35 which detects an output liquid pressure of the front-wheel-use master cylinder MF, and a third pressure sensor 36 which detects an output liquid pressure of the front-wheel-use liquid-pressure generation means 17F are formed on the base body 37.

The first pressure sensor 34 is provided for obtaining an operational load of the brake lever 15 by detecting an output liquid pressure of the front-wheel-use master cylinder MF at the time of closing the first electromagnetic open/close valve 28 and the second pressure sensor 35 is provided for performing a fail-safe diagnosis. When a difference of a predetermined value or more is generated between a detected value of the second pressure sensor 35 and a detected value of the first pressure sensor 34, it is determined that abnormality occurs in the vehicle-use brake device. Further, a detected value of the third pressure sensor 36 is served to a liquid-pressure feedback control at the time of controlling the output liquid pressure of the front-wheel-use liquid-pressure generating means 17F based on the detected value of the first pressure sensor 34.

The first electromagnetic open/close valve 28 is a normally-open electromagnetic open/close valve, and the second and third electromagnetic open/close valves 29, 31 are a normally-closed electromagnetic open/close valve. Open/close operations of the first to third electromagnetic open/close valves 28, 29, 31 and an operation of the electrically-operated motor 19 of the front-wheel-use liquid-pressure generating means 17F are controlled by a control unit 39 to which a battery 38 is connected. Further, to the control unit 39, a detected value of a front-wheel-speed sensor 40F and values detected by the first to third pressure sensors 34, 35, 36 are inputted, and the control unit 39 controls the open/close operations of the first to third electromagnetic open/close valves 28, 29, 31 and the operation of the electrically-operated motor 19 based on the detected value of the front wheel speed sensor 40F and the detected values of the first to third pressure sensors 34 to 36. Further, an alarm lamp 41 is connected to the control unit 39.

When the ignition of the motorcycle is turned on, the first electromagnetic open/close valve 28 assumes an valve-open state, the second and third electromagnetic open/close valves 29, 31 assume a valve-closed state, the electrically-operated motor 19 assumes a non-operated state, and the alarm lamp 41 is in a lighting state. In such a state, when a liquid pressure is outputted from the front-wheel-use master cylinder MF by operating the brake lever 15, the liquid pressure acts on the front-wheel-use wheel brake BF by way of the first electromagnetic open/close valve 28.

When operation of the motorcycle is started, the control unit 39 performs an initial diagnosis. When it is determined that the system is normally operated, an alarm lamp 41 is turned off. After the traveling of the motorcycle is started, the system assumes a standby state where the third electromagnetic open/close valve 31 is opened so that the front-wheel-use master cylinder MF assumes a state where the front-wheel-use master cylinder MF is communicably connected with the stroke simulator 30.

When the brake lever 15 is operated during the standby state and a liquid pressure which is equal to or more than a predetermined value is detected by the first pressure sensor 34, in response to the liquid pressure detected by the first pressure sensor 34, the control unit 39 closes the first electromagnetic open/close valve 28 and, at the same time, opens the second electromagnetic open/close valve 29. Further, the control unit 39 operates the electrically-operated motor 19 of the front-wheel-use liquid-pressure generating means 17F thus controlling an output liquid pressure of the front-wheel-use liquid-pressure generating means 17F so as to set the output pressure of the front-wheel-use liquid-pressure generating means 17F detected by the third pressure sensor 36 to a pressure corresponding to the detected value of the first pressure sensor 34. Accordingly, a liquid pressure outputted from the front-wheel-use liquid-pressure generating means 17F corresponding to an operation load of the brake lever 15 acts on the front-wheel-use wheel brake BF.

The rear-wheel-use hydraulic control unit 18R is constituted in the same manner as the above-mentioned front-wheel-use hydraulic control unit 18F. Thus, the detailed explanation of the rear-wheel-use hydraulic control unit 18R is omitted by illustrating the unit 18R in the drawing and giving the same numerals to portions of the unit 18R corresponding to portions of the front-wheel-use hydraulic control unit 18F. Here, with respect to a hydraulic control performed by the rear-wheel-use hydraulic control unit 18R, the control unit 39 uses a detected value of a rear-wheel speed sensor 40R in place of a detected value of the front-wheel speed sensor 40F which is used for a hydraulic control of the front-wheel-use hydraulic control unit 18F.

Further, the control unit 39 can, by performing a hydraulic control using the rear-wheel-use hydraulic control unit 18R as well as a hydraulic control using the front-wheel-use hydraulic control unit 18F in response to the operation of the brake lever 15, perform a front/rear braking force distribution control which allows the front-wheel-use and rear-wheel-use wheel brakes BF, BR to perform a braking operation so as to apply braking forces distributed to the front wheel and the rear wheel. On the other hand, opposite to such a control, the control unit 39 can, by performing the hydraulic control using the front-wheel-use hydraulic control unit 18F as well as the hydraulic control using the rear-wheel-use hydraulic control unit 18R in response to the operation of the brake pedal 16, also perform the front/rear braking force distribution control which allows the front-wheel-use and rear-wheel-use wheel brakes BF, BR to perform a braking operation so as to apply braking forces distributed to the front wheel and the rear wheel.

To explain the embodiment also in conjunction with FIG. 2 to FIG. 7, the base body 37 includes a mounting surface 37a which constitutes one surface of the base body 37, and first to fourth side surfaces 37b, 37c, 37d, 37e which are orthogonally contiguously formed with the mounting surface 37a. The base body 37 is formed into a rectangular parallelepiped shape by cast molding using light metal such as an aluminum alloy as a material, and first to eighth bottomed mounting holes 44 to 51 are formed in the base body 37 in a state that these mounting holes 44 to 51 open at the mounding surface 37a.

Figure 3:
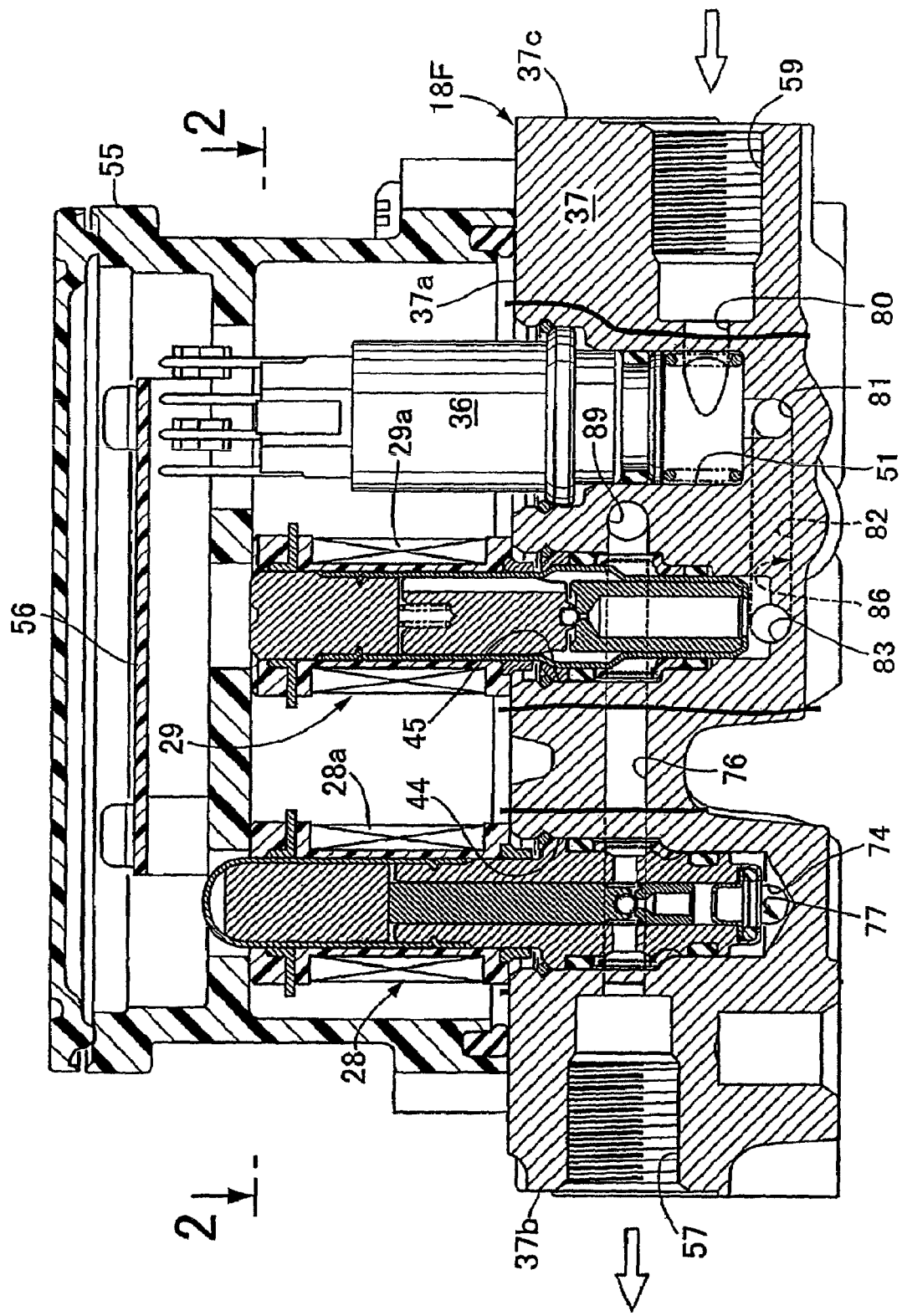
FIG. 3 is a cross-sectional view taken along a line 3-3 in FIG. 2.
Figure 4:
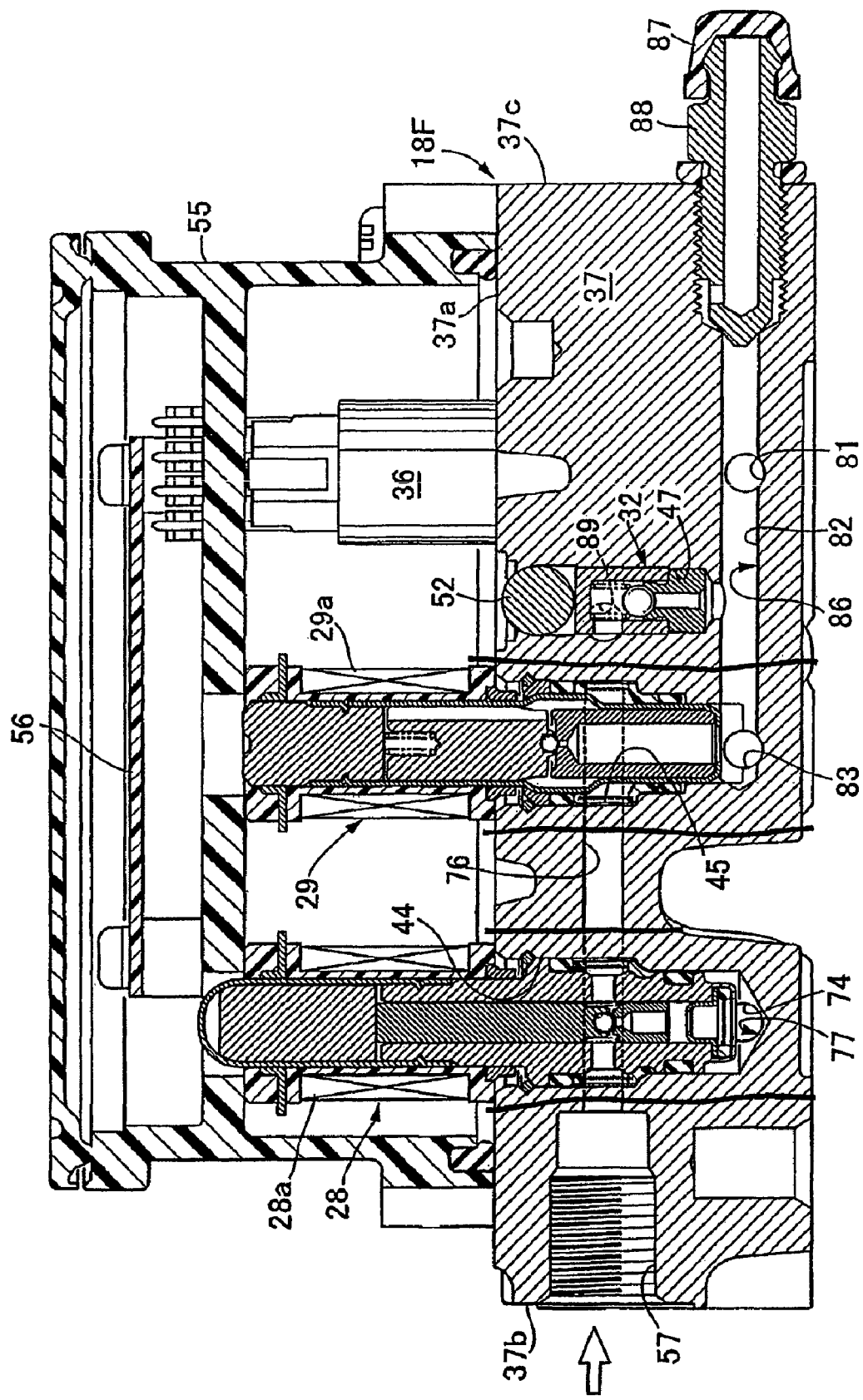
FIG. 4 is a cross-sectional view taken along a line 4-4 in FIG. 2.
Figure 5:
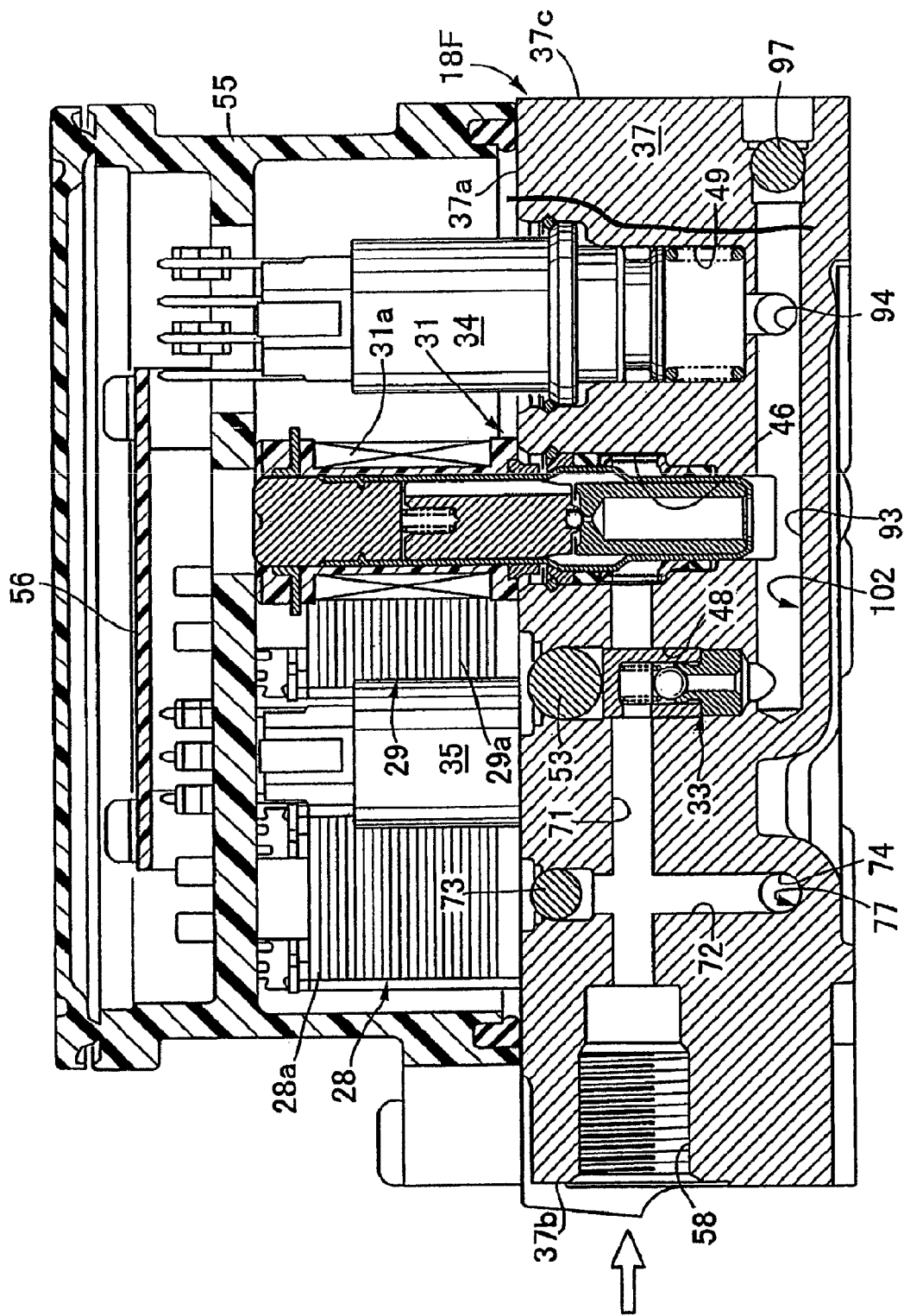
FIG. 5 is a cross-sectional view taken along a line 5-5 in FIG. 2.
Figure 7:
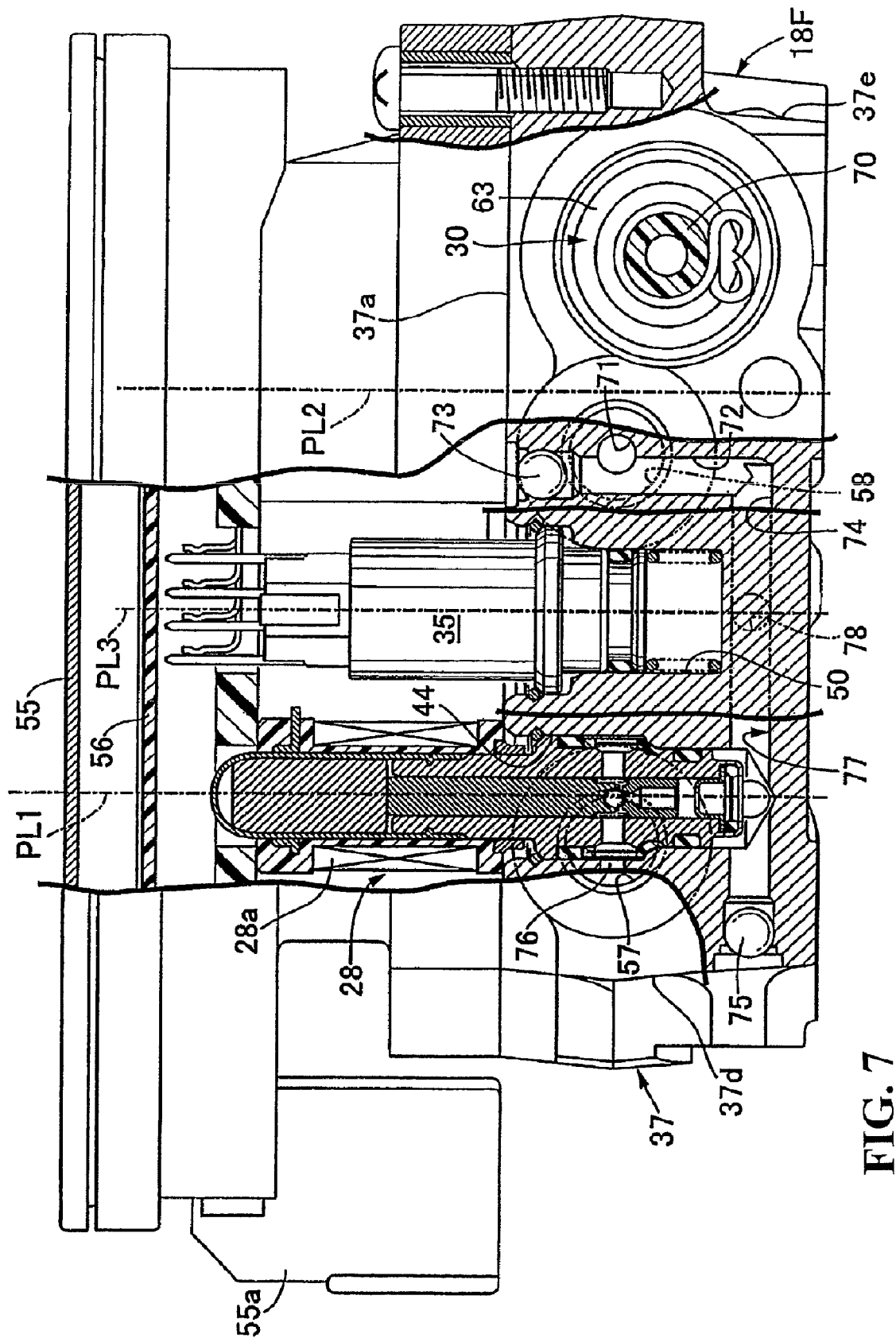
FIG. 7 is a cross-sectional view taken along a line 7-7 in FIG. 2.

As shown in FIG. 3 to FIG. 5, in the first to third mounting holes 44 to 46, first to third electromagnetic open/close valves 28, 29, 31 are respectively mounted in a state that solenoid portions 28a, 29a, 31a of the respective first to third electromagnetic open/close valves 28, 29, 31 project from the mounting surface 37a. Further, in the fourth and fifth mounting holes 47, 48, as shown in FIG. 4 and FIG. 5, first and second one-way valves 32, 33 are respectively inserted. After insertion of the one-way valves 32, 33, opening ends of the fourth and fifth mounting holes 47, 48 are liquid-hermetically closed using steel balls 52, 53. As shown in FIG. 3, FIG. 5 and FIG. 7, in the sixth to eighth mounting holes 49 to 51, first to third pressure sensors 34 to 36 are respectively mounted in a state that portions of the first to third pressure sensors 34 to 36 project from the mounting surface 37a. That is, on the mounting surface 37a of the base body 37, the first to third electromagnetic open/close valves 28, 29 and 31, the first and second one-way valves 32, 33, and first to third pressure sensors 34 to 36 are mounted in the same direction while assuming the direction orthogonal to the mounting surface 37a as the mounting direction.

A synthetic-resin-made cover 55 is mounted on the mounting surface 37a so as to cover the solenoid portions 28a, 29a, 31a of first to third electromagnetic open/close valves 28, 29, 31 and projecting portions of the first to third pressure sensors 34 to 36 from the base body 37. In the inside of the cover 55, a printed circuit board 56 which is electrically connected to the solenoid portions 28a, 29a, 31a and the first to third pressure sensors 34 to 36 is fixedly arranged, and a coupler portion 55a in which connection terminals (not shown in the drawing) connected to the printed circuit board 56 are arranged is integrally formed with the cover 55.

Figure 8:
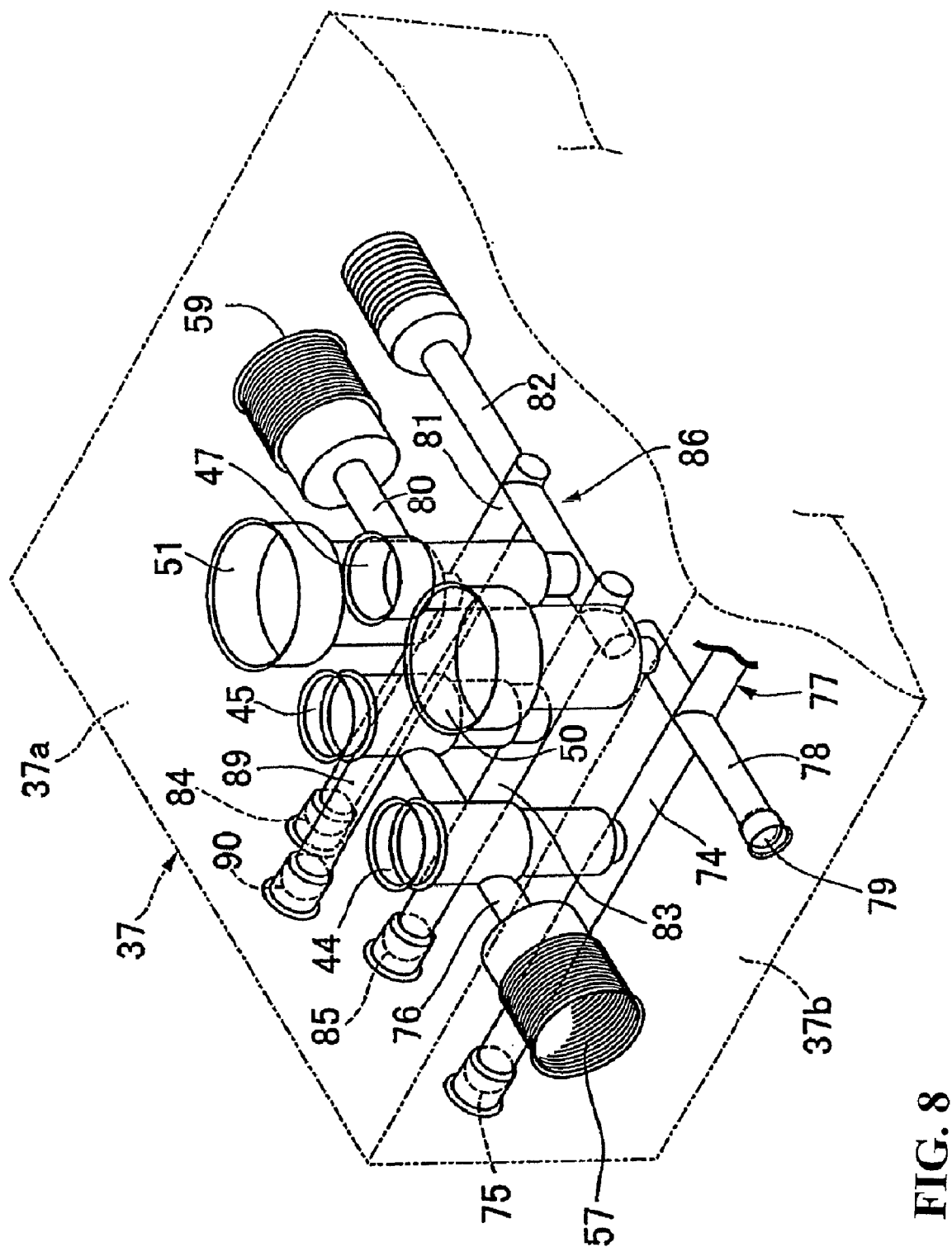
FIG. 8 is a perspective view showing the structure of a passage hole indicated by an arrow 8 in FIG. 2 in a simplified manner in a state wherein a base body is viewed in a see-through manner.
Figure 9:
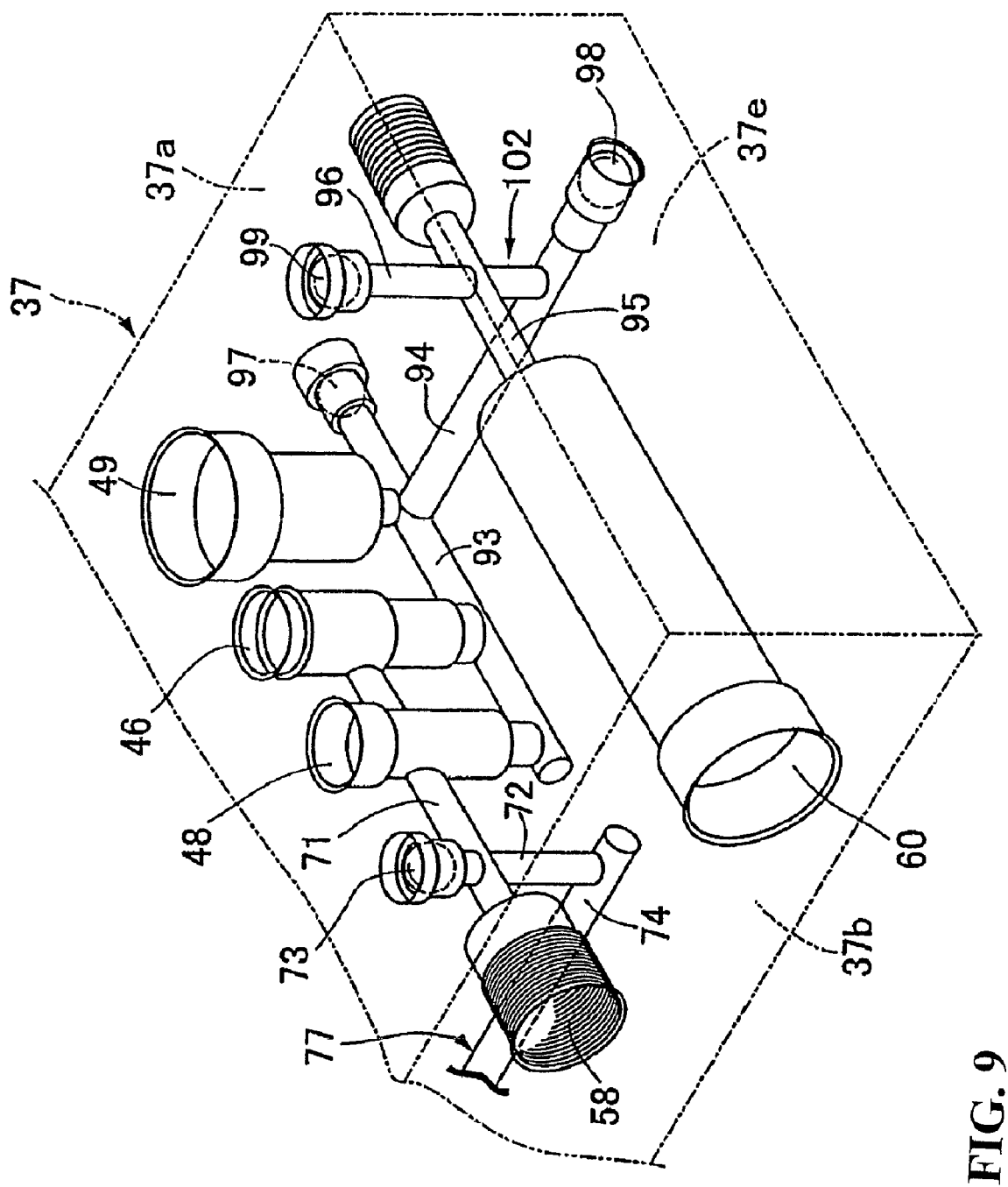
FIG. 9 is a perspective view showing the structure of a passage hole indicated by an arrow 9 in FIG. 2 in a simplified manner in a state that the base body is viewed in a see-through manner.

To explain the embodiment also in conjunction with FIG. 8 and FIG. 9, in the base body 37, an output port 57 and a first input port 58 which open at portions of the first side surface 37b of the base body 37 arranged close to the mounting surface 37a, and a second input port 59 which opens at the second side surface 37c on a side opposite to the first side surface 37b are formed. These ports 57, 58 and 59 are formed in the base body 37 with axes thereof arranged orthogonal to the first and second side surfaces 37b, 37c, that is, parallel to the mounting surface 37a. Further, the output port 57 is connected to the front-wheel-use wheel brake BF, the first input port 58 is connected to the front-wheel-use master cylinder MF, and the second input port 59 is connected to the front-wheel-use liquid-pressure generating means 17F. A distance between the axis of the second input port 59 and the mounting surface 37a is set larger than a distance between the respective axes of the output port 57 and the first input port 58 and the mounting surface 37a.

The operational axes of the first electromagnetic open/close valve 28 and the second electromagnetic open/close valve 29, that is, axes of the first and second mounting holes 44, 45 are arranged on a first plane PL1 (see FIG. 2) which orthogonally intersects with the first side surface 37b of the base body 37. Further, an axis of the third pressure sensor 36, that is, an axis of the eighth mounting hole 51 is arranged on the first plane PL1 at a position where the second electromagnetic open/close valve 29 and the second mounting hole 45 are sandwiched between the first electromagnetic open/close valve 28 and the first mounting hole 44. On the first plane PL1, the operational axes of the first and second electromagnetic open/close valves 28, 29 are arranged and, at the same time, an axis of the third pressure sensor 36 is also arranged.

In the base body 37, the stroke simulator 30 is mounted in a state that the stroke direction of the stroke simulator 30 is arranged parallel to the first plane PL1. In mounting the stroke simulator 30 in the base body 37, a bottomed housing hole 60 having an axis thereof parallel to the first plane PL1 is formed in the base body 37 in a state wherein the housing hole 60 opens at the first side surface 37b.

Figure 6:
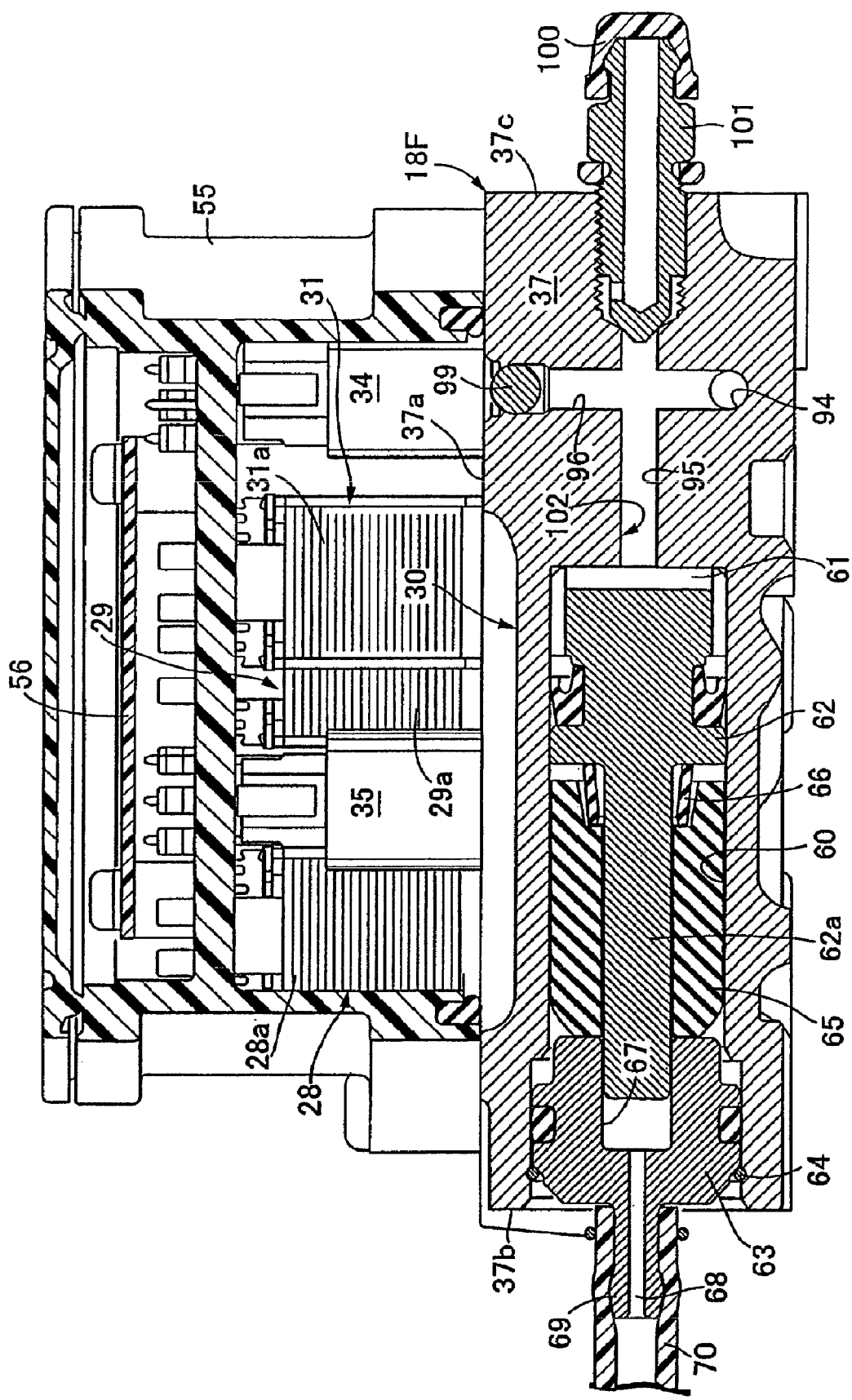
FIG. 6 is a cross-sectional view taken along a line 6-6 in FIG. 2.

To focus on the construction shown in FIG. 6, the stroke simulator 30 includes a piston 62 which is liquid-hermetically and slidably fitted in the housing hole 60 while defining an oil chamber 61 between an inner end of the housing hole 60 and the piston 62 and includes a shaft portion 62a coaxially extending in the direction opposite to the oil chamber 61 as an integral part thereof. A cap 63 is provided which is liquid-hermetically fitted in an opening end portion of the housing hole 60 with a retaining ring 64 which is mounted on an inner surface of the opening end portion of the housing hole 60 in a state that the retaining ring 64 is axially engaged with the cap 63 from the outside in the axial direction so as to prevent removal of the cap 63 from the housing hole 60. A cylindrical resilient body 65 surrounds the shaft portion 62a of the piston 62 in a state wherein an outer end of the cylindrical resilient body 65 is brought into contact with the cap 63 with a rubber 66 which is formed into a cylindrical shape surrounding the shaft portion 62a and is interposed between the resilient body 65 and the piston 62.

In the cap 63, a slide hole 67 that allows for the slide movement of the shaft portion 62a of the piston 62 therein is formed. A connection pipe portion 69 which forms a release passage 68 communicably connected with the slide hole 67 is integrally formed in the cap 63. A rubber hose 70 is connected to the connection pipe portion 69.

In the stroke simulator 30 having such a construction, in response to a liquid pressure which acts on the oil chamber 61, the piston 62 strokes in the axial direction of the housing hole 60, that is, in the direction parallel to the first plane PL1 while deflecting the resilient body 65 and the rubber 66.

Further, a second plane PL2 (see FIG. 2) which is arranged parallel to the first plane PL1 and the stroke direction of the stroke simulator 30 is arranged between the stroke simulator 30 and the first plane PL1, and the third electromagnetic open/close valve 31 and the first pressure sensor 34 are mounted on the base body 37 between the stroke simulator 30 and the first plane PL1 in a state wherein the operational axis of the third electromagnetic open/close valve 31, that is, the axis of the third mounting hole 46 and the axis of the first pressure sensor 34, that is, the axis of the sixth mounting hole 49 are arranged on the second plane PL2. Further, the axis of the second one-way valve 33, that is, the axis of the fifth mounting hole 48 is arranged on the second plane PL2 at a position where the third electromagnetic open/close valve 31 and the third mounting hole 46 are sandwiched between the first pressure sensor 34 and the sixth mounting hole 49. On the second plane PL2, the operational axis of the third electromagnetic open/close valve 31 is arranged. The axes of the first pressure sensor 34 and the second one-way valve 33 are also arranged on the second plane PL2.

Further, the second pressure sensor 35 and the first one-way valve 32 are mounted on the base body 37 in a state wherein the second pressure sensor 35 and the first one-way valve 32 are arranged between the first and second planes PL1, PL2. The axis of the second pressure sensor 35, that is, the axis of the seventh mounting hole 50 and the axis of the first one-way valve 32, that is, the axis of the fourth mounting hole 47 are arranged on a third plane PL3 arranged parallel to the first and second planes PL1, PL2.

The output port 57 is formed in the base body 37 in a state wherein the axis of the output port 57 is arranged at a position slightly displaced toward a side opposite to the second plane PL2 from the first plane PL1. The first input port 58 is formed in the base body 37 in a state wherein the axis of the first input port 58 is arranged at a position slightly displaced toward the first plane PL1 side from the second plane PL2. The second input port 59 is formed in the base body 37 in a state wherein the axis of the second input port 59 is arranged on the first plane PL1.

Further, in the base body 37, a first passage hole 71 which is communicably connected with axially intermediate portions of the fifth mounting hole 48 and the third mounting hole 46 at positions displaced from the axes of the fifth and third mounting holes 48, 46 is formed between the first input port 58 and the third mounting hole 46 coaxially with the first input port 58. In the base body 37, a second passage hole 72 which traverses the first passage hole 71 is formed between the first input port 58 and the fifth mounting hole 48 in a state wherein an opening portion of the second passage hole 72 leading to the mounting surface 37a of the base body 37 is liquid-hermetically closed by a steel ball 73. A third passage hole 74 which makes an inner end portion of the second passage hole 72 and an inner end portion of the first mounting hole 44 communicably connected with each other is formed in the base body 37. The third passage hole 74 is formed from a side of the third side surface 37d which connects the first and second side surfaces 37b, 37c on a side of the first plane PL1 out of the first to third planes PL1 to PL3. An opening end of the third passage hole 74 leading to the third side surface 37d is liquid-hermetically closed by a steel ball 75. Further, in the base body 37, a fourth passage hole 76 which is communicably connected with axially intermediate portions of the first and second mounting holes 44, 45 at positions displaced from axes of the first and second mounting holes 44, 45 is formed in a state wherein the fourth passage hole 76 is coaxially communicably connected with the output port 57.

Due to such first to fourth passage holes 71, 72, 74, 76, a first brake liquid-pressure passage 77 which has both ends thereof respectively communicably connected with the first input port 58 and the output port 57 and, at the same time, interposes the first electromagnetic open/close valve 28 therein is constituted. That is, the first brake liquid-pressure passage 77 includes a portion of the first passage hole 71 between the first input port 58 and the second passage hole 72, the second passage hole 72, the third passage hole 74, and a portion of the fourth passage hole 76 between the first mounting hole 44 and the output port 57. The first electromagnetic open/close valve 28 is interposed between the third passage hole 74 and the fourth passage hole 76.

Figure 2:
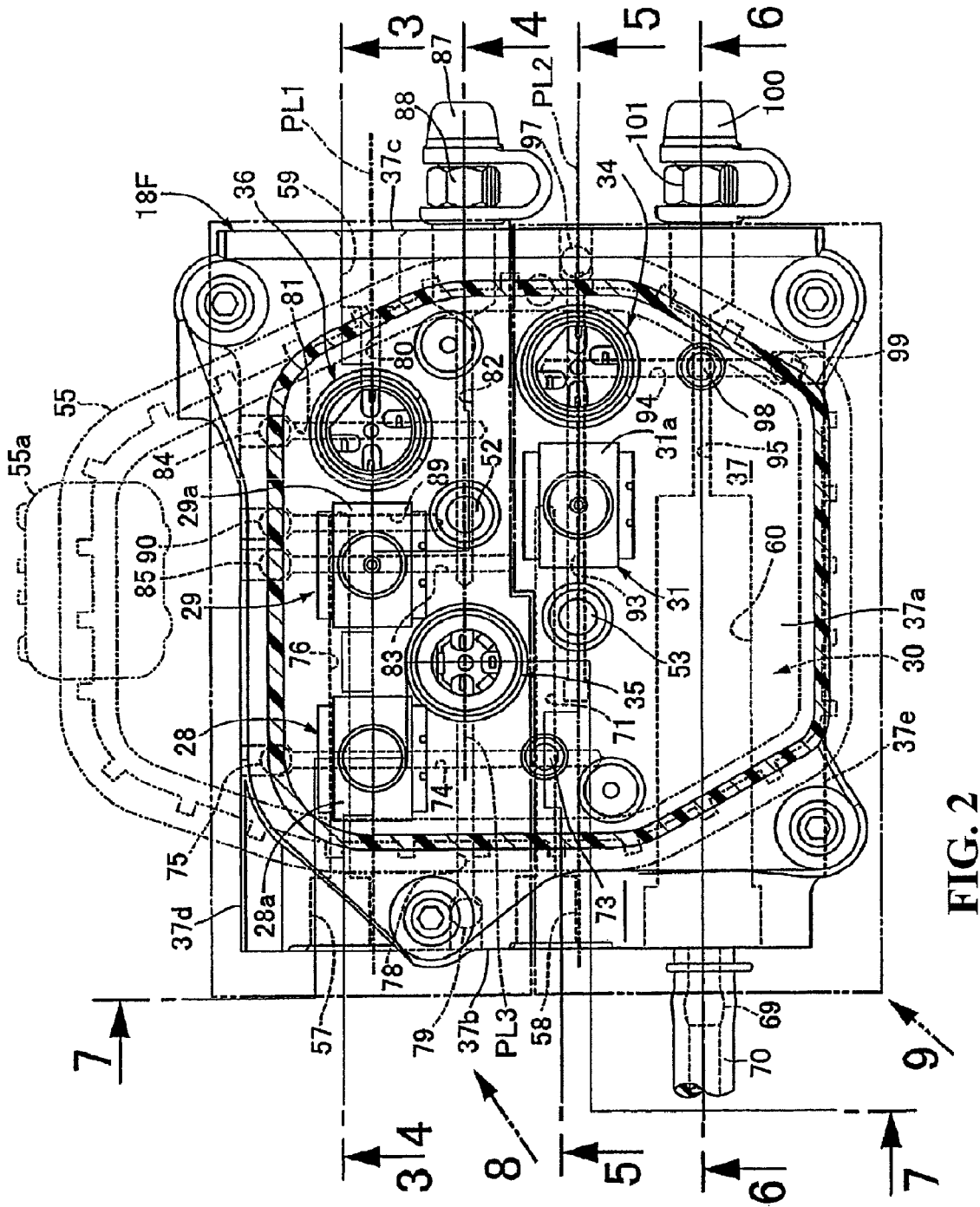
FIG. 2 is a transverse cross-sectional plan view of a hydraulic control unit and is a cross-sectional view taken along a line 2-2 in FIG. 3.

A fifth passage hole 78 which orthogonally traverses the third passage hole 74 in the first brake liquid-pressure passage 77 is formed in the base body 37 in a state wherein the fifth passage hole 78 has an outer end thereof opened at the first side surface 37b and has an inner end thereof communicably connected with an inner end of the seventh mounting hole 50, and an outer-end opening portion of the fifth passage hole 78 is liquid-hermetically closed by a steel ball 79 (see FIG. 2). Due to such construction, in the first brake liquid-pressure passage 77, the second pressure sensor 35 is connected between the first input port 58 and the first electromagnetic open/close valve 28.

Further, in the base body 37, a sixth passage hole 80 which is communicably connected with the second input port 59 by making an inner end of the eighth mounting hole 51 and the second input port 59 communicably connected with each other, a seventh passage hole 81 which has an outer end thereof opened at the third side surface 37d, extends in the direction orthogonal to the sixth passage hole 80 and is communicably connected with an inner end portion of the eighth mounting hole 51, an eighth passage hole 82 which has an outer end thereof opened at the second side surface 37c and extends parallel to the sixth passage hole 80 and passes an inner end of the fourth mounting hole 47, and a ninth passage hole 83 which has an outer end thereof opened at the third side surface 37c, extends parallel to the seventh passage hole 81 and is orthogonally communicably connected with an inner end of the eighth passage hole 82 while passing an inner end of the second mounting hole 45 are formed. Outer ends of the seventh passage hole 81 and the ninth passage hole 83 are respectively liquid-hermetically closed by steel balls 84, 85 (see FIG. 2).

Due to such sixth to ninth passage holes 80, 81, 82, 83 and the fourth passage hole 76, a second brake liquid-pressure passage 86 which has both ends thereof respectively communicably connected with the second input port 59 and the output port 57 and interposes the second electromagnetic open/close valve 29 therein is constructed. The third pressure sensor 36 is connected to the second brake liquid-pressure passage 86 between the second input port 59 and the second electromagnetic open/close valve 29. More specifically, the second brake liquid-pressure passage 86 includes the sixth passage hole 80, a portion of the seventh passage hole 81 between the eighth mounting hole 51 and the eighth passage hole 82, a portion of the eighth passage hole 82 between the seventh passage hole 81 and the ninth passage hole 83, a portion of the ninth passage hole 83 between the eighth hole passage 82 and the second mounting hole 45, and the fourth passage hole 76. The second electromagnetic open/close valve 29 is interposed between the ninth passage hole 83 and the fourth passage hole 76. Further, a bleeder 88 on which a cap 87 is detachably mounted is threadedly engaged with an outer end portion of the eighth passage hole 82.

Further, in the base body 37, a tenth passage hole 89 which has an outer end thereof opened at the third side surface 37d, traverses an inner end of the fourth passage hole 76, and has an inner end thereof opened at an intermediate portion of the fourth mounting hole 47 is formed. The outer end of the tenth passage hole 89 is liquid-hermetically closed by a steel ball 90. Due to such construction, the first one-way valve 32 which bypasses the second electromagnetic open/close valve 29 is connected to the second brake liquid-pressure passage 86.

In the base body 37, an eleventh passage hole 93 which has an outer end thereof opened at the second side surface 37c, has an axis thereof arranged on the second plane PL2 and is orthogonally communicably connected with inner ends of the fifth mounting hole 48, the third mounting hole 46 and the sixth mounting hole 49, a twelfth passage hole 94 which has an outer end thereof opened at the fourth side surface 37e facing a side opposite to the third side surface 37d, extends in the direction orthogonal to the eleventh passage hole 93 and has an inner end thereof communicably connected with an inner end of the sixth mounting hole 49, a thirteenth passage hole 95 which has an outer end thereof opened at the second side surface 37c and is coaxially communicably connected with the housing hole 60, and a fourteenth passage hole 96 which has an outer end thereof opened at the mounting surface 37a, orthogonally traverses an intermediate portion of the thirteenth passage hole 95, and has an inner end thereof orthogonally communicably connected with the twelfth passage hole 94 are formed. Outer ends of the eleventh passage hole 93, the twelfth passage hole 94 and the fourteenth passage hole 96 are liquid-hermetically closed by steel balls 97, 98, 99. Further, a bleeder 101 on which a cap 100 is detachably mounted is threadedly engaged with an outer end portion of the thirteenth passage hole 95.

Due to such eleventh to fourteenth passage holes 93 to 96 and first passage hole 71, a branch passage 102 which is branched from the first brake liquid-pressure passage 77 between the first electromagnetic open/close valve 28 and the first input port 58, is connected to the stroke simulator 30, and interposes the third electromagnetic open/close valve 31 therein is constituted. The first pressure sensor 34 is connected to the branch passage 102 between the third electromagnetic open/close valve 31 and the stroke simulator 30, and the second one-way valve 33 is connected to the branch passage 102 in a state wherein the second one-way valve 33 bypasses the third electromagnetic open/close valve 31.

More specifically, the branch passage 102 includes a portion of the first passage hole 71 from the second passage hole 72 to the third mounting hole 46, a portion of the eleventh passage hole 93 from the third mounting hole 46 to the sixth mounting hole 49, a portion of the twelfth passage hole 94 from the third mounting hole 49 to the fourteenth passage hole 96, a portion of the fourteenth passage hole 96 from the twelfth passage hole 94 to the thirteenth mounting hole 95, and a portion of the thirteenth passage hole 95 from the fourteenth passage hole 96 to the housing hole 60. The third electromagnetic open/close valve 31 is interposed between the first passage hole 71 and the eleventh passage hole 93, and the second one-way valve 33 which bypasses the third electromagnetic open/close valve 31 is also interposed between the first passage hole 71 and the eleventh passage hole 93.

Figure 10:
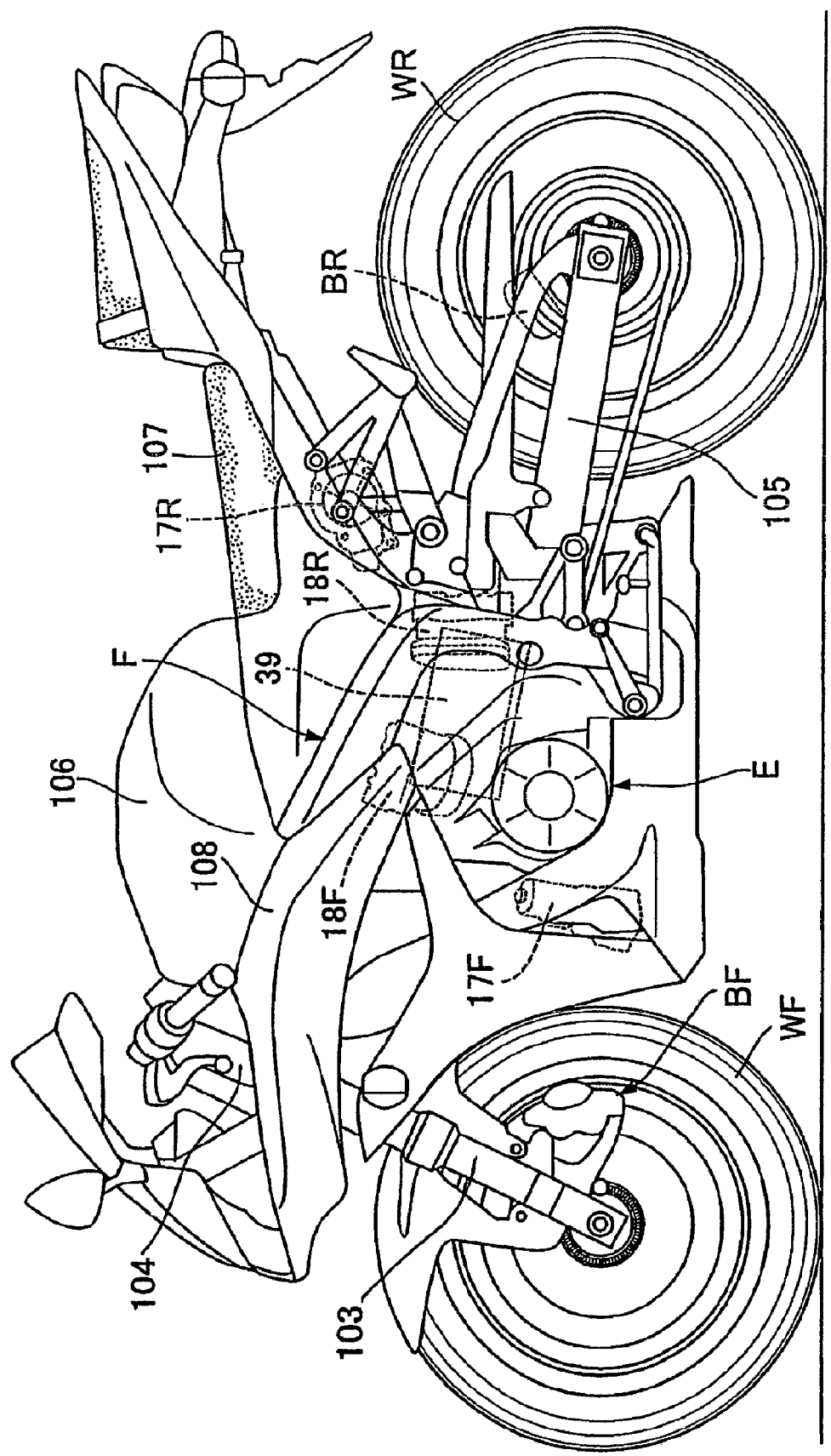
FIG. 10 is a left side view of a motorcycle.

In FIG. 10, a vehicle body frame F of the motorcycle mounts a head pipe 104 on a front end thereof. The head pipe 104 steerably supports a front fork 103 which pivotally supports a front wheel WF thereon. The front-wheel-use wheel brake BF is mounted on the front wheel WF. A rear wheel WR on which the rear-wheel-use wheel brake BR is mounted is pivotally supported on a rear end portion of a swing arm 105, and a front end portion of the swing arm 105 is vertically tiltably supported on the vehicle body frame F. An engine E which generates power for rotating the rear wheel WR is arranged between the front wheel WF and the rear wheel WR and is mounted on the vehicle body frame F. A fuel tank 106 is mounted on the vehicle body frame F above the engine E, and a pillion seat 107 arranged behind the fuel tank 106 is supported on the vehicle body frame F.

A portion of the vehicle body frame F and a portion of the engine E are covered with a vehicle body cover 108. In a space which is covered by the vehicle body cover 108 and is positioned in the vicinity of the engine E, that is, in the vicinity of the center of the vehicle body, the front-wheel-use liquid-pressure generating means 17F, the front-wheel-use hydraulic control unit 18F, the rear-wheel-use liquid-pressure generating means 17R, the rear-wheel-use hydraulic control unit 18R, and the control unit 39 are arranged.

Next, the manner of operation of this embodiment is explained. The first and second electromagnetic open/close valves 28, 29 and the third pressure sensor 36 are mounted on the mounting surface 37a of the base body 37 from the same direction in a state wherein the operational axes of these components are arranged on the same first plane PL1. Accordingly, a width necessary for the arrangement of the first and second electromagnetic open/close valves 28, 29 and the third pressure sensor 36 in the direction orthogonal to the first plane PL1 can be set to a small value thus contributing to the miniaturization of the base body 37. Further, the first plane PL1 orthogonally intersects with the first side surface 37b of the base body 37 in which the output ports 57 connected to the wheel brakes BF, BR are formed, and the first and second electromagnetic open/close valves 28, 29 are also respectively connected to the output ports 57. Thus, a liquid-pressure passage which respectively connects the first and second electromagnetic open/close valves 28, 29 with the output ports 57, the fourth passage hole 76 in this embodiment, can be formed into a simple shape linearly extending parallel to the first plane PL1 thus reducing the working man-hours in forming the holes in the base body 37.

Further, the stroke simulator 30 is arranged in the base body 37 with the stroke direction thereof set parallel to the first plane PL1. Thus, a width of the base body 37 in the direction orthogonal to the first plane PL1 can be made small thus contributing to the miniaturization of the base body 37.

Further, in the a portion of the branch passage 102 which is branched from the first brake liquid-pressure passage 77 having both ends thereof communicably connected to the first input port 58 and the output port 59 which are connected to the master cylinders MF, MR and providing the first electromagnetic open/close valve 28 in the portion thereof and is connected to the stroke simulator 30, the third electromagnetic open/close valve 31 changing over communication/interruption between the master cylinders MF, MR and the stroke simulator 30 is provided. Further, the first pressure sensor 34 which detects the pressure on a side of the stroke simulator 30 is connected to the portion of the branch passage 102. The operation axis of the third electromagnetic open/close valve 31 and the axes of the first pressure sensor 34 and the second one-way valve 33 are arranged on the second plane PL2 arranged parallel to the first plane PL1 and the stroke direction of the stroke simulator 30. Accordingly, it is possible to decrease the width necessary for the arrangement of the first to third electromagnetic open/close valves 28, 29, 31, the first and second one-way valves 32, 33, and the first and third pressure sensors 34, 36 in the direction orthogonal to the first and second planes PL1, PL2 thus contributing to the miniaturization of the base body 37.

Further, out of the branch passage 102, the portions which are connected to the third electromagnetic open/close valve 31 and the first pressure sensor 34, that is, the first passage hole 71 and the eleventh passage hole 93 in this embodiment, are formed into a simple linear shape parallel to the second plane PL2. Accordingly, it is possible to reduce working man-hours in forming the branch passage 102 in the base body 37. Further, the third electromagnetic open/close valve 31 and the first pressure sensor 34 are mounted on the base body 37 in the same direction as the first and second electromagnetic open/close valves 28, 29. Thus, it is possible to efficiently assemble the first to third electromagnetic open/close valves 28, 29, 31 and the first pressure sensor 34 to the base body 37. Further, the second and third pressure sensors 35, 36 and the first and second one-way valves 32, 33 are also mounted on the base body 37 in the same direction as the first to third electromagnetic open/close valves 28, 29 and 31. Thus, it is possible to further efficiently perform the assembling operation of these parts.

Further, the second pressure sensor 35 which is connected to the first brake liquid-pressure passage 77 between the first input port 58 and the first electromagnetic open/close valve 28 and the first one-way valve 32 are arranged in the base body 37 between the first and second planes PL1, PL2. Accordingly, the first to third electromagnetic open/close valves 28, 29, 31, the first and second one-way valves 32, 33 and the first to third pressure sensors 34 to 36 can be collectively arranged in the base body 37 in a compact manner thus realizing the further miniaturization of the base body 37.

Although an embodiment of the present invention has been explained heretofore, the present invention is not limited to the above-mentioned embodiment and various modifications in design are conceivable without departing from the present invention described in claims.

For example, the present invention is broadly applicable not only to the motorcycle explained in the above-mentioned embodiment but also to a three-wheeled vehicle or other vehicles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle-use brake device in which first electromagnetic open/close valves changing over communication/interruption between master cylinders which output liquid pressures corresponding to operations of brake operators and wheel brakes, and second electromagnetic open/close valves changing over communication/interruption between liquid-pressure generation means which are configured to generate liquid pressures due to operations of electrically-operated actuators and the wheel brakes are arranged in a base body, comprising:

output ports connected to the wheel brakes are formed in one flat side surface of the base body, and the first and second electromagnetic open/close valves which have operational axes thereof arranged on a first plane orthogonal to said one side surface are mounted on one surface of the base body orthogonal to said one side surface from the same direction, wherein stroke simulators which apply pseudo reactional forces corresponding to operation quantities of the brake operators to the master cylinders at the time of closing the first electromagnetic open/close valves are arranged in the base body with stroke directions thereof set parallel to the first plane.

2. The vehicle-use brake device according to claim 1, wherein input ports which are connected to the master cylinders, brake liquid pressure passages each of which has both ends thereof communicably connected to the input port and the output port and interposes the first electromagnetic open/close valve therein, and branch passages each of which is branched from the brake liquid pressure passage between the first electromagnetic open/close valve and the input port and is connected to the stroke simulator are arranged in the base body, and third electromagnetic open/close valves each of which is interposed in the branch passage so as to change over communication/interruption between the master cylinder and the stroke simulator and first pressure sensors each of which is connected to the branch passage between the third electromagnetic open/close valve and the stroke simulator so as to detect a pressure on the stroke simulator side are, in a state that an operational axis of the third electromagnetic open/close valves and the first pressure sensors are arranged on a second plane parallel to the first plane and the stroke direction of the stroke simulator, mounted on the base body from the same direction as the mounting direction of the first and second electromagnetic open/close valves.

3. The vehicle-use brake device according to claim 2, and further including a control unit for operatively controlling the first, second and third electromagnetic open/close valves and for controlling the electrically-operated actuators of a front-wheel-use liquid-pressure generating means.

4. The vehicle-use brake device according to claim 3, wherein a detected value of a front-wheel-speed sensor and values detected by the first, second and third electromagnetic open/close valves are inputted to the control unit for controlling the open/close operations of the first, second and third electromagnetic open/close valves and the operation of the electrically-operated actuators based on the detected valve of the front-wheel-speed sensor and the detected values of the first pressure sensor and a second pressure sensor and a third pressure sensor.

5. The vehicle-use brake device according to claim 3, wherein when the brake lever is operated during a standby state and a liquid pressure which is equal to or more than a predetermined value is detected by the first pressure sensor, in response to the liquid pressure detected by the first pressure sensor, the control unit closes the first electromagnetic open/close valve and, at the same time, opens the second electromagnetic open/close valve;

wherein the control unit operates the electrically-operated motor of the front-wheel-use liquid-pressure generating means thus controlling an output liquid pressure of a front-wheel-use liquid-pressure generating means so as to set the output pressure of the front-wheel-use liquid-pressure generating means detected by the third pressure sensor to a pressure corresponding to the detected value of the first pressure sensor; and wherein a liquid pressure outputted from the front-wheel-use liquid-pressure generating means corresponding to an operation load of the brake lever acts on the front-wheel-use wheel brake.

6. The vehicle-use brake device according to claim 3, wherein the control unit performs a hydraulic control using a rear-wheel-use hydraulic control unit as well as a hydraulic control using the front-wheel-use hydraulic control unit in response to the operation of a front brake lever to perform a front/rear braking force distribution control for allowing the front-wheel-use and rear-wheel-use wheel brakes to perform a braking operation so as to apply braking forces distributed to the front wheel and the rear wheel.

7. The vehicle-use brake device according to claim 3, wherein the control unit performs a hydraulic control using a front-wheel-use hydraulic control unit as well as the hydraulic control using a rear-wheel-use hydraulic control unit in response to the operation of the brake pedal for performing the front/rear braking force distribution control for allowing the front-wheel-use and rear-wheel-use wheel brakes to perform a braking operation so as to apply braking forces distributed to the front wheel and the rear wheel.

8. The vehicle-use brake device according to claim 2, wherein second pressure sensors each of which is connected to the brake liquid pressure passage between the input port and the first electromagnetic open/close valve so as to detect a liquid pressure on the master cylinder side are arranged in the base body between the first and second planes.

9. The vehicle-use brake device according to claim 2, wherein the output port is formed in the base body in a position slightly displaced toward a side opposite to the second plane from the first plane and the first input port is formed in the base body in a state wherein the axis of the first input port is arranged at a position slightly displaced toward the first plane side from the second plane and the second input port is formed in the base body in a state wherein the axis of the second input port is arranged on the first plane.

10. A vehicle-use brake device comprising:
first electromagnetic open/close valves changing over communication/interruption between master cylinders which output liquid pressures corresponding to operations of brake operators and wheel brakes;
second electromagnetic open/close valves changing over communication/interruption between liquid-pressure generation means which are configured to generate liquid pressures due to operations of electrically-operated actuators and the wheel brakes are arranged in a base body; and
output ports connected to the wheel brakes, said output ports being formed in one flat side surface of the base body;
wherein said first and second electromagnetic open/close valves include operational axes arranged on a first plane orthogonal to said one flat side surface,
wherein stroke simulators which apply pseudo reactional forces corresponding to operation quantities of the brake operators to the master cylinders at the time of closing the first electromagnetic open/close valves are arranged in the base body with stroke directions thereof set parallel to the first plane.

11. The vehicle-use brake device according to claim 10, wherein input ports are connected to the master cylinders, brake liquid pressure passages each of which has both ends thereof communicably connected to the input port and the output port and interposes the first electromagnetic open/close valve therein, and branch passages each of which is branched from the brake liquid pressure passage between the first electromagnetic open/close valve and the input port and is connected to the stroke simulator are arranged in the base body, and
third electromagnetic open/close valves each of which is interposed in the branch passage so as to change over communication/interruption between the master cylinder and the stroke simulator and first pressure sensors each of which is connected to the branch passage between the third electromagnetic open/close valve and the stroke simulator so as to detect a pressure on the stroke simulator side are, in a state that an operational axis of the third electromagnetic open/close valves and the first pressure sensors are arranged on a second plane parallel to the first plane and the stroke direction of the stroke simulator, mounted on the base body from the same direction as the mounting direction of the first and second electromagnetic open/close valves.

12. The vehicle-use brake device according to claim 11, and further including a control unit for operatively controlling the first, second and third electromagnetic open/close valves and for controlling the electrically-operated actuators of a front-wheel-use liquid-pressure generating means.

13. The vehicle-use brake device according to claim 12, wherein a detected value of a front-wheel-speed sensor and values detected by the first, second and third electromagnetic open/close valves are inputted to the control unit for controlling the open/close operations of the first, second and third electromagnetic open/close valves and the operation of the electrically-operated actuators based on the detected valve of the front-wheel-speed sensor and the detected values of the first pressure sensor and a second pressure sensor and a third pressure sensor.

14. The vehicle-use brake device according to claim 12, wherein when the brake lever is operated during a standby state and a liquid pressure which is equal to or more than a predetermined value is detected by the first pressure sensor, in response to the liquid pressure detected by the first pressure sensor, the control unit closes the first electromagnetic open/close valve and, at the same time, opens the second electromagnetic open/close valve;
wherein the control unit operates the electrically-operated motor of the front-wheel-use liquid-pressure generating means thus controlling an output liquid pressure of a front-wheel-use liquid-pressure generating means so as to set the output pressure of the front-wheel-use liquid-pressure generating means detected by the third pressure sensor to a pressure corresponding to the detected value of the first pressure sensor; and
wherein a liquid pressure outputted from the front-wheel-use liquid-pressure generating means corresponding to an operation load of the brake lever acts on the front-wheel-use wheel brake.

15. The vehicle-use brake device according to claim 12, wherein the control unit performs a hydraulic control using a rear-wheel-use hydraulic control unit as well as a hydraulic control using the front-wheel-use hydraulic control unit in response to the operation of a front brake lever to perform a front/rear braking force distribution control for allowing the front-wheel-use and rear-wheel-use wheel brakes to perform a braking operation so as to apply braking forces distributed to the front wheel and the rear wheel.

16. The vehicle-use brake device according to claim 12, wherein the control unit performs a hydraulic control using a front-wheel-use hydraulic control unit as well as the hydraulic control using a rear-wheel-use hydraulic control unit in response to the operation of the brake pedal for performing the front/rear braking force distribution control for allowing the front-wheel-use and rear-wheel-use wheel brakes to perform a braking operation so as to apply braking forces distributed to the front wheel and the rear wheel.

17. The vehicle-use brake device according to claim 11, wherein second pressure sensors each of which is connected to the brake liquid pressure passage between the input port and the first electromagnetic open/close valve so as to detect a liquid pressure on the master cylinder side are arranged in the base body between the first and second planes.

18. The vehicle-use brake device according to claim 11, wherein the output port is formed in the base body in a position slightly displaced toward a side opposite to the second plane from the first plane and the first input port is formed in the base body in a state wherein the axis of the first input port is arranged at a position slightly displaced toward the first plane side from the second plane and the second input port is formed in the base body in a state wherein the axis of the second input port is arranged on the first plane.

19. A vehicle-use brake device in which first electromagnetic open/close valves changing over communication/interruption between front-wheel-use and rear-wheel-use master cylinders which output liquid pressures corresponding to operations of brake operators and front and rear wheel brakes, and second electromagnetic open/close valves changing over communication/interruption between front-wheel-use and rear-wheel-use liquid-pressure generation means which are configured to generate liquid pressures due to operations of electrically-operated actuators and the front and rear wheel brakes are arranged in a base body, comprising:
 output ports connected to the front and rear wheel brakes are formed in one flat side surface of the base body, and the first and second electromagnetic open/close valves which have operational axes thereof arranged on a first plane orthogonal to said one side surface are mounted on one surface of the base body orthogonal to said one side surface from the same direction, and
 a first input port connected to the front-wheel-use master cylinder, and a second input port connected to the front-wheel-use liquid-pressure generating means,
 wherein the first input port is formed in the one flat side surface of the base body, and the second input port is formed on a second flat side surface of the base body that is opposite to the one flat surface.

* * * * *